(12) United States Patent
Ikeda et al.

(10) Patent No.: US 10,094,700 B2
(45) Date of Patent: Oct. 9, 2018

(54) CONVEYOR APPARATUS AND COMBINED WEIGHING APPARATUS

(71) Applicant: Ishida Co., Ltd., Kyoto (JP)

(72) Inventors: Shinya Ikeda, Ritto (JP); Toshiharu Kageyama, Ritto (JP); Takakazu Moriwaki, Ritto (JP); Yoshito Inazumi, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 15/549,738

(22) PCT Filed: Feb. 10, 2016

(86) PCT No.: PCT/JP2016/053968
§ 371 (c)(1),
(2) Date: Aug. 9, 2017

(87) PCT Pub. No.: WO2016/129635
PCT Pub. Date: Aug. 18, 2016

(65) Prior Publication Data
US 2018/0023996 A1  Jan. 25, 2018

(30) Foreign Application Priority Data

Feb. 10, 2015 (JP) .................................. 2015-024657
Feb. 10, 2015 (JP) .................................. 2015-024660
Feb. 20, 2015 (JP) .................................. 2015-032131

(51) Int. Cl.
*B65G 43/00* (2006.01)
*B65G 43/08* (2006.01)
(Continued)

(52) U.S. Cl.
CPC ............. *G01G 11/08* (2013.01); *B65G 27/08* (2013.01); *B65G 65/005* (2013.01); *B65G 65/32* (2013.01);
(Continued)

(58) Field of Classification Search
None
See application file for complete search history.

(56) References Cited

U.S. PATENT DOCUMENTS 3,805,905 A * 4/1974 McClusky ................ B65B 1/22
 177/160
4,511,009 A * 4/1985 Kataoka ............... G01G 19/393
 177/1

(Continued)

FOREIGN PATENT DOCUMENTS

JP   H07-198466 A   8/1995
JP   H11-071012 A   3/1999
(Continued)

OTHER PUBLICATIONS

International Search Report issued in PCT/JP2016/053968; dated May 10, 2016.
(Continued)

Primary Examiner — Kavel Singh
(74) Attorney, Agent, or Firm — Studebaker & Brackett PC

(57) ABSTRACT

Provided is a conveyor apparatus in which weighing accuracy in a combined weighing apparatus can be improved. In this conveyor apparatus in which a radial feeder (30) controls the operation of a trough (31) such that a article supplied from the trough becomes a target supply amount, the apparatus includes: a ranging sensor (32) for detecting a height (S) of the article on the trough; a drive unit (33) for driving a trough unit with predetermined feed power (P); a supply amount acquiring part (93) for acquiring a supply amount (W) supplied from the trough (31); and a deriving part (94) for deriving a relation among the height of the article, the supply amount of the trough, and the feed power of the trough by changing the feed power from the drive unit multiple times to convey the article to the trough.

13 Claims, 8 Drawing Sheets

(51) Int. Cl.
  *B65G 47/74* (2006.01)
  *G01G 11/08* (2006.01)
  *B65G 27/08* (2006.01)
  *G01G 19/387* (2006.01)
  *B65G 65/00* (2006.01)
  *B65G 65/32* (2006.01)
  *B65G 65/44* (2006.01)
  *G01G 19/393* (2006.01)

(52) U.S. Cl.
  CPC .......... *B65G 65/44* (2013.01); *G01G 19/387* (2013.01); *G01G 19/393* (2013.01); *B65G 2201/02* (2013.01)

(56) References Cited

U.S. PATENT DOCUMENTS

| | | | | |
|---|---|---|---|---|
| 4,548,286 | A * | 10/1985 | Sashiki | G01G 19/393 177/1 |
| 4,708,215 | A * | 11/1987 | Nakamura | G01G 13/026 177/109 |
| 5,074,435 | A | 12/1991 | Suverkrop et al. | |
| 7,305,933 | B2 * | 12/2007 | Kitagawa | A23P 20/17 118/19 |
| 8,466,380 | B2 * | 6/2013 | Inoue | G01G 13/08 177/145 |

FOREIGN PATENT DOCUMENTS

| | | |
|---|---|---|
| JP | 2002-062185 A | 2/2002 |
| JP | 2004-130786 A | 4/2004 |
| JP | 2009-008400 A | 1/2009 |
| JP | 2013-002902 A | 1/2013 |
| WO | 95/031702 A1 | 11/1995 |
| WO | 2013/137008 A1 | 9/2013 |

OTHER PUBLICATIONS

Notification of Transmittal of Translation of the International Preliminary Report on Patentability and Translation of Written Opinion of the International Searching Authority; PCT/JP2016/053968; dated Aug. 24, 2017.

An Office Action mailed by the Japanese Patent Office dated May 15, 2018, which corresponds to Japanese Patent Application No. 2016-574832 and is related to U.S. Appl. No. 15/549,738.

* cited by examiner

CONVEYOR APPARATUS AND COMBINED WEIGHING APPARATUS

TECHNICAL FIELD

The present invention relates to a conveyor apparatus and a combined weighing apparatus.

BACKGROUND ART

An apparatus described in Patent Literature 1 is known, for example, as a conventional combined weighing apparatus. Such a combined weighing apparatus described in Patent Literature 1 includes a plurality of conveying means for conveying articles, a plurality of weighing means for weighing the articles supplied by each of the conveying means, imaging means for imaging the articles on the conveying means, an image processing means for determining a transporting situation of the articles on the conveying means on the basis of an image signal from the imaging means, a predicting means for predicting a change in a supply amount of articles from each of the conveying means on the basis of the transporting situation, and a controlling means for changing a control amount of each of the conveying means to control the change in the supply amount from each of the conveying means on the basis of the predicted result.

CITATION LIST

Patent Literature

[Patent Literature 1] PCT International Publication No. WO/1995/031702

SUMMARY OF INVENTION

Technical Problem

It is a necessary to supply articles from a conveying means to a weighing means so that a supply amount supplied to the weighing means becomes a target supply amount to improve a weighing accuracy in a combined weighing apparatus. A conventional combined weighing apparatus predicts whether a supply amount is increased or reduced on the basis of a weighed result from a weighing means or a transporting situation in a conveying means. The conventional combined weighing apparatus controls a supply amount of the conveying means to become the target supply amount on the basis of this predicted result. However, the conventional combined weighing apparatus cannot highly accurately control the supply amount of the conveying means to become the target supply amount because feed power of the conveying means is controlled only on the basis of whether the supply amount is increased or reduced.

The present invention is directed to providing a conveyor apparatus in which a weighing accuracy in a combined weighing apparatus is improved, and the combined weighing apparatus.

Solution to Problem

A conveyor apparatus according to an aspect of the present invention is a conveyor apparatus that controls an operation of a conveying unit such that articles supplied from the conveying unit becomes a target supply amount, and includes: a detecting unit configured to detect a heights (S) of the article on the conveying unit; a drive unit configured to drive the conveying unit with predetermined feed power; a supply amount acquiring part configured to acquire a supply amount (W) supplied from the conveying unit; and a deriving part configured to change the feed power from the drive unit multiple times to convey the article to the conveying unit, acquire the height (S) of the article and the supply amount (W) when the different types of feed power are set, and derive a relation among the height of the article, the supply amount of the conveying unit, and the feed power of the conveying unit using the acquired height (S) of the article and the acquired supply amount (W).

In the conveyor apparatus of this constitution, the drive unit can be controlled with optimal feed power for making a target supply amount on the basis of the feed power that can be obtained from the relation among the height of the article, the supply amount of the conveying unit, and the feed power of the conveying unit wherein the relation is automatically derived by the deriving part. Further, the deriving part can automatically derive the relation among the height of the article, the supply amount of the conveying unit, and the feed power of the conveying unit even in an unknown weighing target in a new product or the like. If this relation is used for conveyance control, the article can be supplied from the conveying unit to become the target supply amount. When this conveyor apparatus is used in a combined weighing apparatus, and thereby weighing accuracy is improved, and an operating rate is improved.

In an embodiment, the conveyor apparatus further includes a control unit configured to drive the drive unit with the feed power obtained from the height detected in the detecting unit and the target supply amount in the relation. In the conveyor apparatus of this constitution, when the control unit controls the conveying unit on the basis of the relation derived by the deriving part, the article can be supplied to become the target supply amount. This conveyor apparatus is used in the combined weighing apparatus, and thereby the weighing accuracy and the operating rate are improved.

In an embodiment, the deriving part calculates a coefficient (A) and a coefficient (B) in a formula below on the basis of the height (S) and the supply amount (W) that are acquired for each of the different types of feed power (P) when the deriving part changes the feed power from the drive unit multiple times to convey the article to the conveying unit.

$$P = A \times W/S + B$$

In the conveyor apparatus of this constitution, the drive unit can be controlled with the optimal feed power for achieving the target supply amount on the basis of the feed power that can be obtained on the basis of a relation between the coefficient (A) and the coefficient (B) that are automatically derived by the deriving part.

In an embodiment, the conveyor apparatus further includes an updating part configured to update the coefficient (A) and the coefficient (B) on the basis of the height (S) and the supply amount (W) that are acquired when the article is conveyed in a state in which the feed power is controlled to become the target supply amount. In the conveyor apparatus of this constitution, for example since the coefficients are updated to a relational expression that takes a situation upstream of the conveyor apparatus into consideration, the control for conveying the article with the optimal feed power for achieving the target supply amount is possible in a real machine.

In an embodiment, the deriving part calculates the coefficient (A) and the coefficient (B) by smoothing the height (S) and the supply amount (W) with respective moving averages. In the conveyor apparatus of this constitution, the height (S) acquired by the detecting unit and the supply amount (W) acquired by the supply amount acquiring part, which are raw data, are smoothed, and an approximate straight line that is a relational expression between the height (S) and the supply amount (W) is derived, and then a relational expression between a slope of the approximate straight line and a strength is derived.

A combined weighing apparatus according to an aspect of the present invention is a combined weighing apparatus that includes: a distribution unit configured to distribute articles; a plurality of conveying units configured to convey the articles supplied from the distribution unit; and a plurality of weighing units arranged corresponding to the plurality of conveying units and configured to weigh the articles supplied from the conveying units and controls an operation of each of the conveying units such that the articles supplied to the weighing units become a target supply amount, and includes: detecting units configured to detect heights of the articles on the conveying units; a storing part configured to store relations among the heights of the articles, supply amounts of the conveying units, and feed power of the conveying units; and a control unit configured to control the conveying units with the feed power obtained from the heights detected by the detecting units and the target supply amounts in the relations.

In this combined weighing apparatus, the control unit controls the conveying units with the feed power obtained from the heights detected by the detecting units and the target supply amounts in the relations stored in the storing part. The relations among the heights of the articles, supply amounts of the conveying units, and feed power of the conveying units are stored in the storing part. With this constitution, in the combined weighing apparatus, the conveying units can be controlled with optical feed power for making the target supply amounts. Therefore, in the combined weighing apparatus, the articles can be supplied from the conveying units to the weighing units to become the target supply amounts. As a result, in the combined weighing apparatus, the weighing accuracy is improved.

In an embodiment, the combined weighing apparatus includes a correcting part configured to correct the feed power on the basis of differences between weighed values of the articles weighed in the weighing units and the target supply amounts. Thereby, since the weighed values of the articles weighed in the weighing units are actually reflected on the feed power, the control with higher accuracy is possible.

In an embodiment, the detecting units detect the heights of the articles located adjacent to discharge ends of the conveying units. Thereby, the control unit can detect the heights of the articles just prior to being supplied to the weighing hoppers, that is the articles supplied to the weighing hoppers next. For this reason, the feed power can be set more properly. As a result, the articles can be stably supplied to the weighing hoppers at the target supply amounts.

In an embodiment, the combined weighing apparatus includes an updating part configured to update the relations stored in the storing part during operation. With this constitution, the relations of the storing part can be updated depending on, for instance, a change in supplied state of the articles from the distribution table, or a change in situation such as a change in property of the article. Thereby, the feed power of the conveying units can be controlled on the basis of the updated information. For this reason, even when a change in conveyance situation occurs, the articles can be stably supplied to the weighing hoppers at the target supply amounts.

In an embodiment, when the feed power is defined as P, the height is defined as S, and the supply amount is defined as W, the feed power (P) is calculated on the basis of a formula below:

$$P = A \times W/S + B$$

Here, A and B are coefficients. The above formula is used, the feed power of the conveying units is unambiguously obtained.

In an embodiment, the supply amounts (W), the coefficient (A), and the coefficient (B) are stored in the storing part by corresponding to shapes of the articles and/or conveying passages of the conveying units. Thereby, the control corresponding to the shapes of the articles and/or conveying passages of the conveying units is possible. For this reason, the trouble of an operator changing the setting of the coefficients or the like in each of the shapes of the articles and/or the conveying passages of the conveying units can be avoided.

In an embodiment, the conveying units convey the articles depending on vibration, and the feed power is an amplitude in the conveying units. The amplitude of the vibration is changed in the conveying units that convey the articles depending on the vibration, and thereby the supply amount of the articles can be controlled. Thereby, the control of the supply amount can be performed without depending on an operation capability.

In an embodiment, the plurality of detecting units are provided in conveying directions of the conveying units. Thereby, the heights of the articles in multiple places can be detected. For this reason, the conveying units can be controlled on the basis of an overall state of the articles conveyed by the conveying units.

Advantageous Effects of Invention

According to the present invention, weighing accuracy is improved in a combined weighing apparatus.

DESCRIPTION OF EMBODIMENTS

Figure 1:
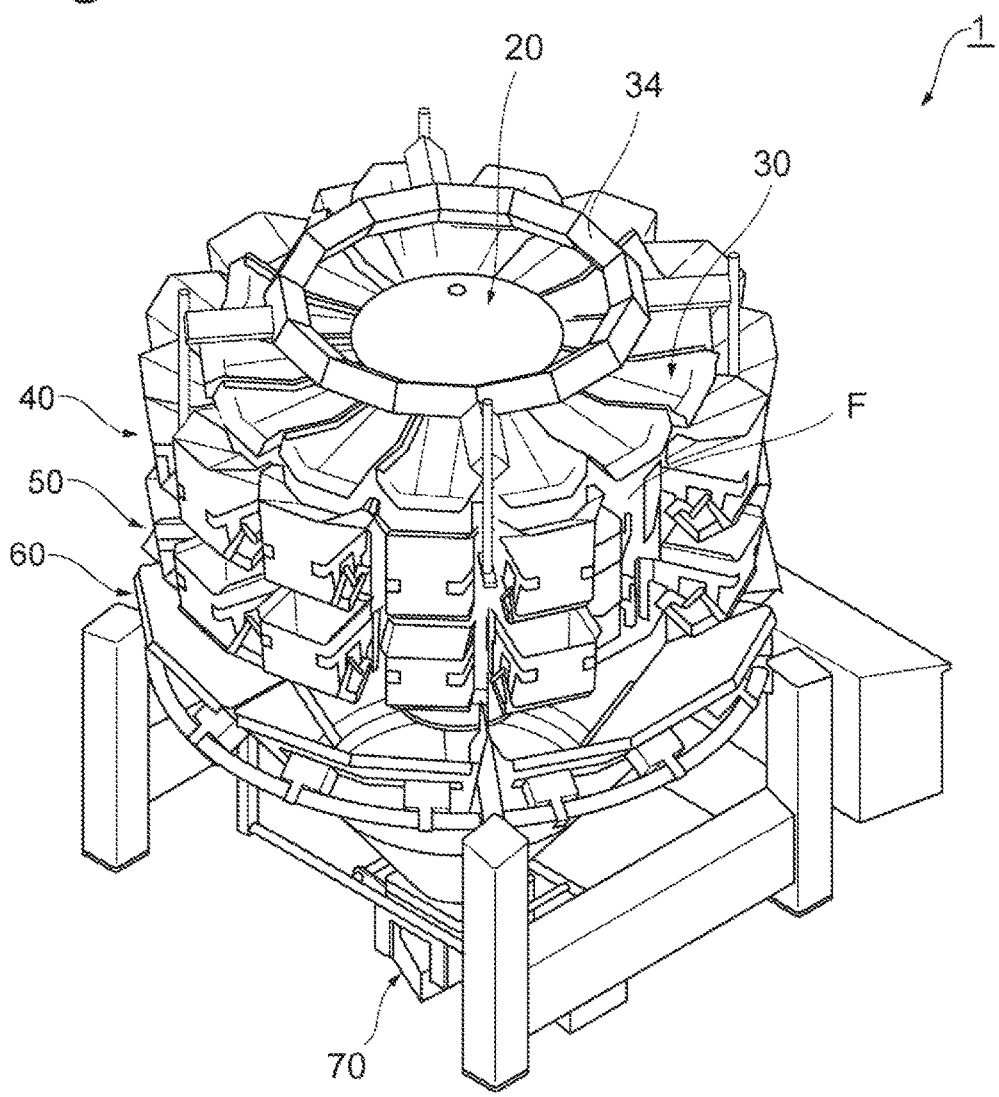
FIG. 1 is a perspective view illustrating a combined weighing apparatus according to a first embodiment.

Hereinafter, an embodiment will be described with reference to the drawings. In the description of the drawings, the same elements are given the same reference sign, and duplicate descriptions thereof will be omitted. A dimensional ratio in the drawings is not necessarily identical with that of the description.

First Embodiment (Overall Constitution)

Figure 2:
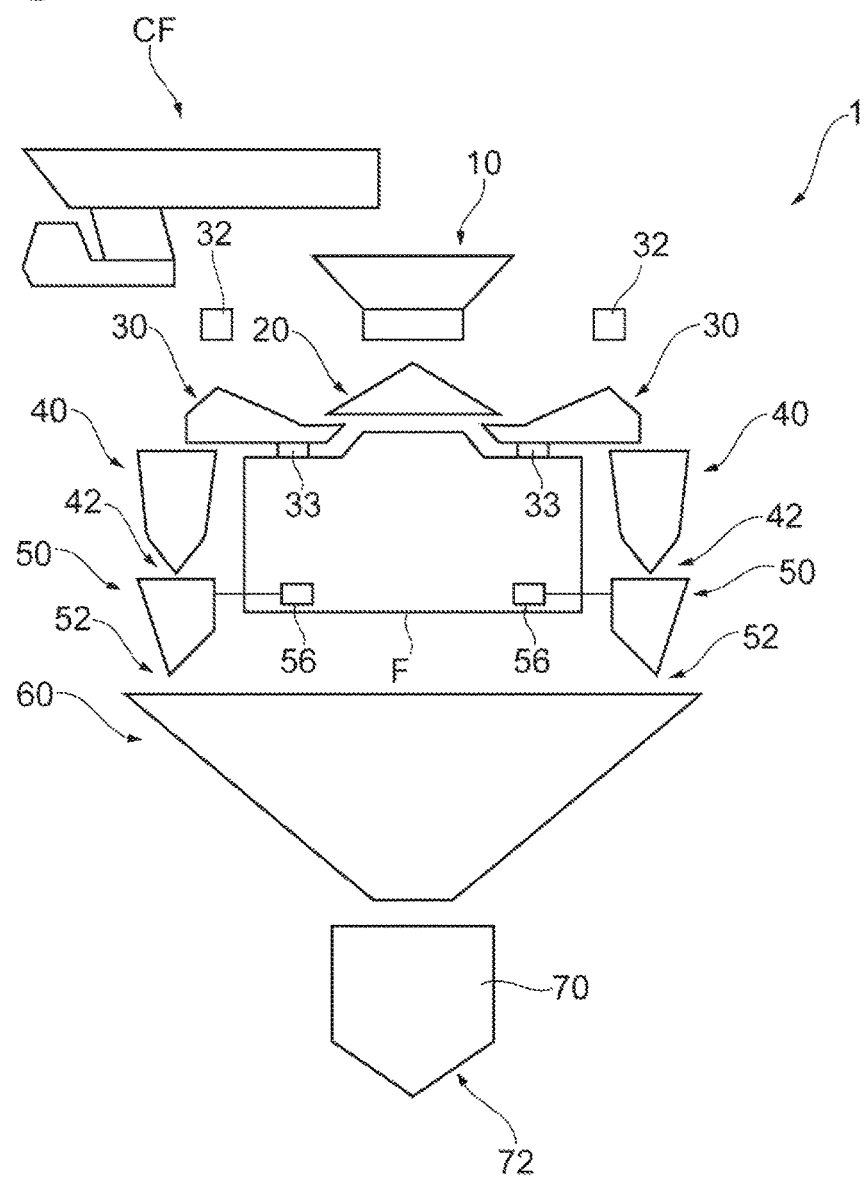
FIG. 2 is a schematic view illustrating a constitution of the combined weighing apparatus.
Figure 3:
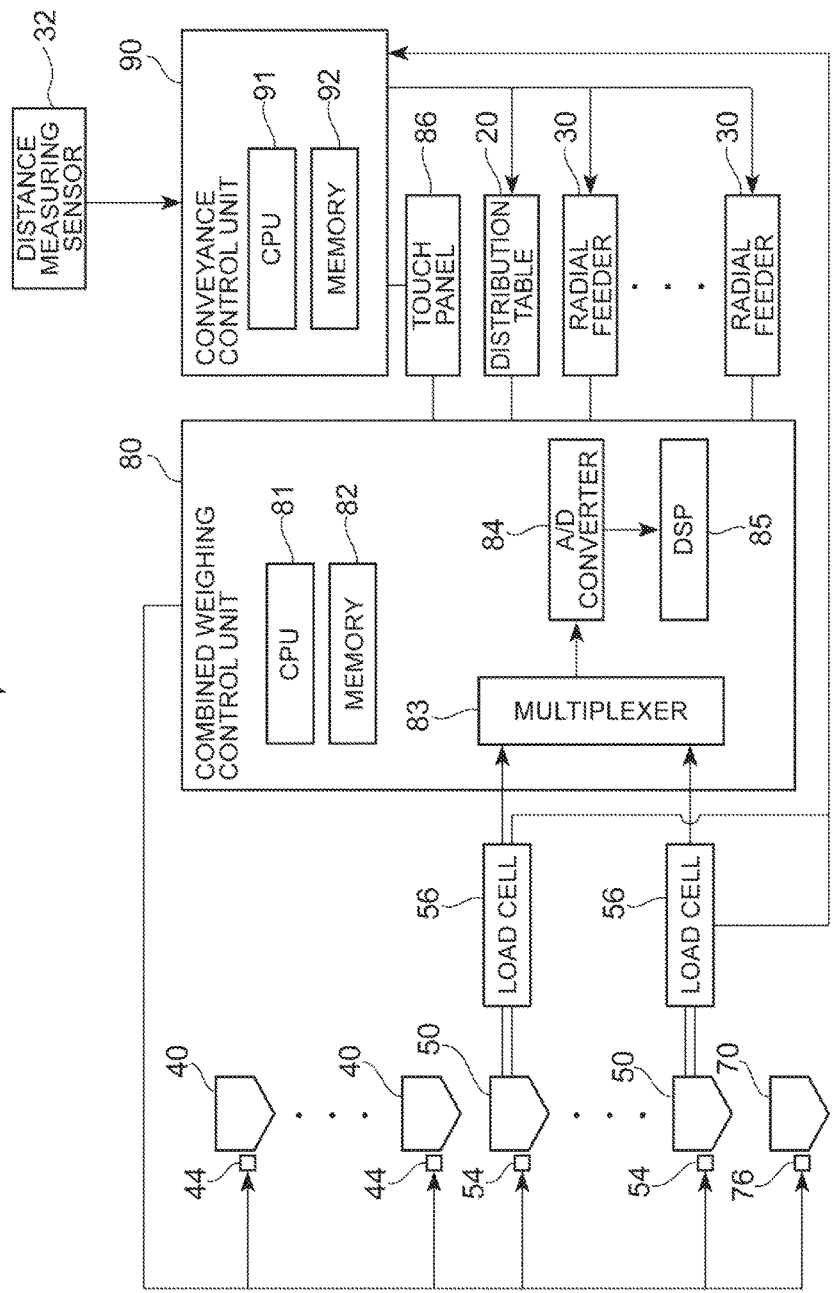
FIG. 3 is a block diagram illustrating a hardware constitution of the combined weighing apparatus.

FIG. 1 is a perspective view illustrating a combined weighing apparatus according to a first embodiment. FIG. 2 is a schematic view illustrating a constitution of the combined weighing apparatus. FIG. 3 is a block constitutional diagram of the combined weighing apparatus.

A combined weighing apparatus 1 includes an article supply chute 10, a distribution table (a distribution unit) 20, a plurality of radial feeders (conveyor apparatuses or conveying units) 30, a plurality of pool hoppers 40, a plurality of weighing hoppers 50, a collection discharge chute unit 60, a timing hopper 70, and a combined weighing control unit 80.

The combined weighing apparatus 1 having the above constitution functions as follows. In the combined weighing apparatus 1, articles are conveyed as weighing targets of the combined weighing apparatus 1 by a cross feeder CF. The articles are, for instance, foodstuffs. Articles conveyed by the cross feeder CF are placed in the article supply chute 10. The articles placed in the article supply chute 10 are supplied to the distribution table 20. The distribution table 20 conveys the articles while distributing the articles, and supplies the articles to the plurality of radial feeders 30 arranged around the distribution table 20. The radial feeders 30 convey the articles, which are supplied from the distribution table 20, to the pool hoppers 40 provided corresponding to the radial feeders 30, and supply the articles to the corresponding pool hoppers 40.

The pool hoppers 40 supply the articles to the weighing hoppers 50 arranged below the pool hoppers 40. The combined weighing control unit 80 performs a combined weighing calculation from weighed values of load cells 56 (to be described below), which the weighing hoppers 50 have (weighed values of the articles in the weighing hoppers 50). The combined weighing control unit 80 selects a combination of articles which has a result of the combined weighing calculation that is closest to a target value within a predetermined allowable range. The weighing hoppers 50 included in the selected combination supply the articles to the collection discharge chute unit 60. The collection discharge chute unit 60 supplies the articles to the timing hopper 70. The timing hopper 70 supplies the articles to, for instance, a bag making and packaging machine or the like that is installed on a rear stage of the combined weighing apparatus 1.

(Detailed Constitution)

Next, a constitution of the combined weighing apparatus 1 will be described in detail.

(Article Supply Chute)

As illustrated in FIGS. 1 and 2, the article supply chute 10 is disposed below an end of the cross feeder CF that places articles in the article supply chute 10 (an end of a side at which the articles are placed in the article supply chute 10). The article supply chute 10 is disposed above the distribution table 20. The article supply chute 10 is supplied with articles conveyed by the cross feeder CF, and supplies the articles to the distribution table 20.

(Distribution Table)

The distribution table 20 is a table-like member formed in a conical shape. The distribution table 20 is supplied with articles from the cross feeder CF installed above the distribution table 20 via the article supply chute 10. The distribution table 20 is vibrated by, for instance, an electromagnet (not shown) to convey the supplied articles outward in a radial direction while distributing the supplied articles in a circumferential direction. The distribution table 20 supplies articles conveyed to a periphery thereof to the plurality of radial feeders 30 arranged below a peripheral side of the distribution table 20.

(Radial Feeders)

The combined weighing apparatus 1 has the plurality of radial feeders 30 (here, 14 radial feeders). The plurality of radial feeders 30 are arranged around the distribution table 20 in an annular shape. To be specific, the plurality of radial feeders 30 radially extend around the distribution table 20.

The radial feeders 30 include troughs (conveying units) 31, distance measuring sensors (detecting units) 32, drive units 33, and a conveyance control unit 90 (see FIG. 3).

The troughs 31 form conveying passages along which articles are conveyed from the distribution table 20 side to the pool hopper 40 side.

The drive units 33 vibrate the troughs 31 with predetermined feed power P to convey the articles supplied from the distribution table 20 outward in the radial direction (a direction away from the distribution table 20). Each of the troughs 31 supplies the article conveyed to a periphery thereof to each of the pool hoppers 40 disposed below a peripheral side of each of the troughs 31. The drive units 33 are, for example, electromagnets.

The distance measuring sensors 32 are disposed above the troughs 31 to correspond to the troughs 31. That is, in the present embodiment, the number of distance measuring sensors 32 is 14. The distance measuring sensors 32 are mounted on support frames 34 fixed to weighing mechanism frames F, and are located above the troughs 31.

Figure 4:
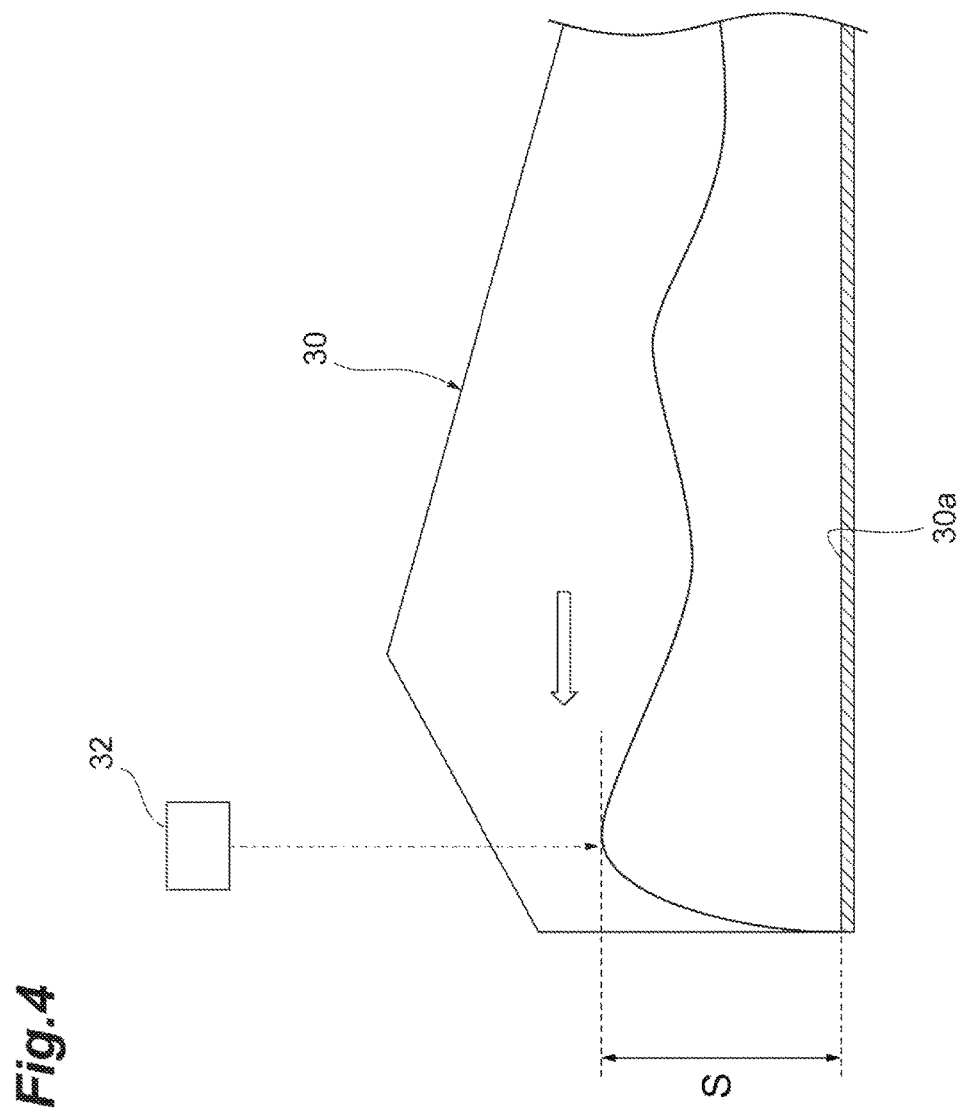
FIG. 4 is a view illustrating the vicinity of a discharge end of a radial feeder.

Each of the distance measuring sensors 32 detects a distance between the ranging sensor 32 and an article on the trough 31. The ranging sensor 32, for example, applies a beam toward the article and receives beams reflected by the article to obtain the distance between the ranging sensor 32 and the article. As illustrated in FIG. 4, the ranging sensor 32 detects a distance from an article located in the vicinity of a discharge end of the trough 31. The vicinity of the discharge end is a position that recedes a predetermined distance from a leading end of the trough 31 in a conveying direction of the trough 31. As an example, the vicinity of the discharge end is a position that recedes about 30 mm to 50 mm from the leading end of the trough 31. The distance measuring sensors 32 output detection signals indicating the distances from the detected articles to the conveyance control unit 90.

As illustrated in FIG. 3, the conveyance control unit 90 is connected to the distribution table 20, components of the radial feeders 30 such as the distance measuring sensors 32, the drive units 33, etc., and a touch panel 86. The touch panel 86 is a liquid crystal display (LCD) that has both input and output functions. The touch panel 86 functions as an input unit and an output unit. The touch panel 86 receives inputs such as various settings related to conveyance control. For example, the touch panel 86 receives inputs of operation parameters such as vibration intensities of the radial feeders 30, vibration times of the radial feeders 30, and the like. The touch panel 86 of the present embodiment also functions as both an input unit and an output unit in the combined weighing control unit 80.

The conveyance control unit 90 controls the drive units 33 of the radial feeders 30 on the basis of operation parameters such as vibration intensities of the distribution table 20 and the radial feeders 30 and/or vibration times of the radial feeders 30, which are input from the touch panel 86. Thereby, the conveyance control unit 90 vibrates the troughs 31. A target supply amount TW of articles supplied from the radial feeders 30 to the weighing hoppers 50 via the pool hoppers 40 is included in the operation parameters. The target supply amount TW is a target amount (a constant value) of articles to be supplied to the weighing hoppers 50 per unit of time. The target supply amount TW is set for each article.

The conveyance control unit 90 has a central processing unit (CPU) 91 and a memory 92 such as a read only memory (ROM), a random access memory (RAM), or the like.

Figure 5:
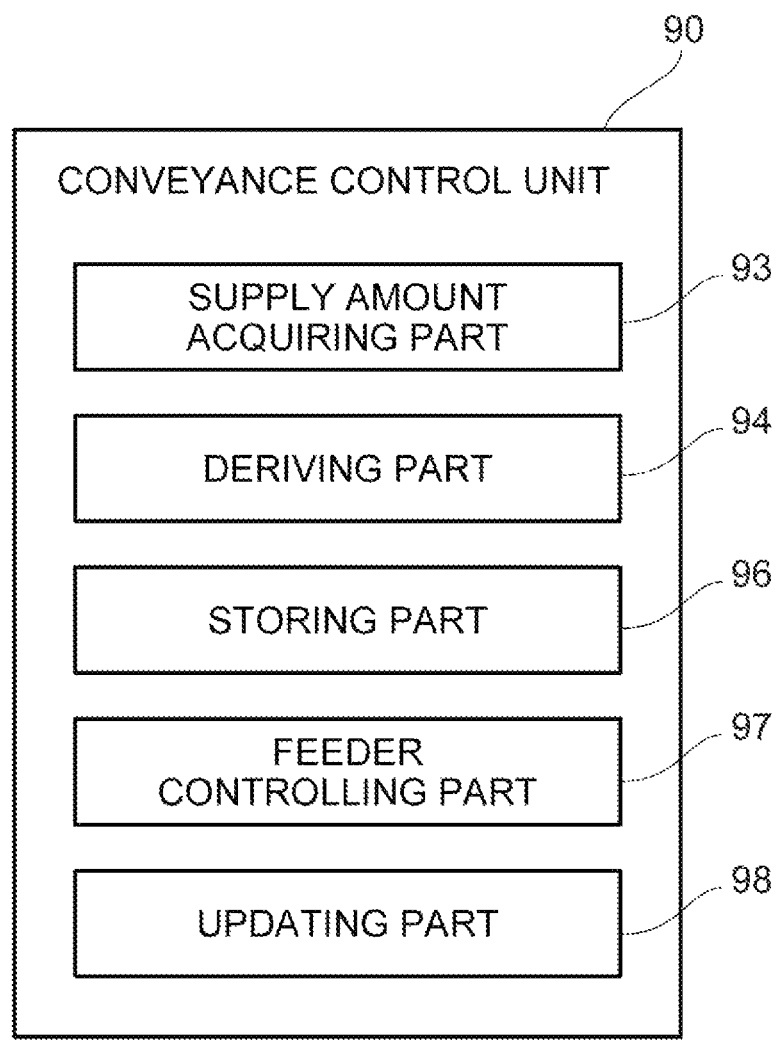
FIG. 5 is a block diagram illustrating a functional constitution of a conveyance control unit.

FIG. 5 is a block diagram illustrating a functional constitution of the control unit. As illustrated in FIG. 5, the conveyance control unit 90 has a supply amount acquiring part 93, a deriving part 94, a storing part 96, a feeder controlling part (a controlling part) 97, and an updating part 98. The conveyance control unit 90 is a conceptual portion that executes various control processes in the radial feeders. Here, the supply amount acquiring part 93, the deriving part 94, the feeder controlling part 97, and the updating part 98 are configured as, for instance, software in which a program stored in a ROM is loaded on a RAM and is executed by the CPU 91.

The supply amount acquiring part 93 acquires an actually supplied supply amount W from the corresponding trough 31. To be specific, the supply amount acquiring part 93 acquires weighed values G from signals input from the load cells 56 connected to the weighing hoppers 50 (to be described below). The acquired weighed values G are sent to the deriving part 94 as the supply amounts W.

The deriving part 94 changes the feed power P from the drive units 33 multiple times and conveys the articles to the troughs 31. Thereby, the deriving part 94 derives a relation among a height S of the article, the supply amount W of the trough 31, and the feed power P of the trough 31, that is, formula (1) below.

$$P = A \times W/S + B \quad (1)$$

Here, the feed power P is an amplitude of vibration of the radial feeder 30. When a value of the feed power P is small, the amplitude is reduced. For this reason, the supply amount of articles supplied from the radial feeder 30 to the weighing hopper 50 (the pool hopper 40) is reduced. When the value of the feed power P is great, the amplitude is increased. For this reason, the supply amount of the articles supplied from the radial feeder 30 to the weighing hopper 50 is increased.

As illustrated in FIG. 4, the height S is a distance between a bottom 30a of the radial feeder 30 and an upper portion of an article in the vicinity of the discharge end of the radial feeder 30. The supply amount W is an amount of articles supplied from the radial feeder 30 to the weighing hopper 50 via the pool hopper 40.

In formula (1) above, "A" and "B" are coefficients, and are values set corresponding to a shape of the radial feeder 30 and/or a type of article. The deriving part 94 derives the coefficients A and B.

The deriving part 94 vibrates the trough 31 with respect to the drive unit 33 with the predetermined feed power P to convey the article supplied from the distribution table 20 outward in the radial direction. On this occasion, the deriving part 94 acquires the height S and the weighed value G at a given time. The height S is a value indicated by the ranging sensor 32, and the weighed value G is a value acquired by the supply amount acquiring part 93.

The deriving part 94 performs a smoothing process on heights S from data measured in this way (for instance, calculates a moving average of 10 sections), and obtains a smoothed height Sm. Likewise, the deriving part 94 performs a smoothing process on the weighed values G (for instance, calculates a moving average of 10 sections), and obtains a smoothed weighed value Gm. The deriving part 94 derives formula (2) below, which is an approximate straight line indicating a relation between the smoothed height Sm and the smoothed weighed value Gm.

$$Gm = aSm \quad (2)$$

In formula (2) above, "a" is a slope obtained from the relation between the smoothed height Sm and the smoothed weighed value Gm.

Here, according to the above formula (1), the slope a and the feed power P have a relation of formula (3) below.

$$a = (1/A)P - B/A \quad (3)$$

The deriving part 94 vibrates the trough 31 with respect to the drive unit 33 with the feed power P different from a previous feed power to convey the article. On this occasion, the deriving part 94 measures the height S and the weighed value G at a given time, and calculates the smoothed height Sm and the smoothed weighed value Gm. The deriving part 94 derives a relation between "a," the slope of the approximate straight line in formula (2) above, and the feed power P. That is, the deriving part 94 derives the coefficients A and B.

The storing part 96 stores the relation among the height S of the article, the supply amount W of the radial feeder 30, and the feed power P of the radial feeder 30 from the coefficients A and B derived by the deriving part 94. To be specific, the above formula (1) is stored in the storing part 96.

The feeder controlling part 97 controls the feed power P of the radial feeder 30. The feeder controlling part 97 controls the radial feeder 30 (the drive unit 33) with the feed power P obtained from the height S of the article based on the distance detected by the ranging sensor 32 and the supply amount W, which became a set target supply amount, using the above formula (1). The feeder controlling part 97 calculates the height S of the article on the basis of the distance indicated by the detection signal sent from the ranging sensor 32. To be specific, the feeder controlling part 97 calculates the height S of the article on the basis of a difference between the distance from the bottom 30a of the radial feeders 30 to the ranging sensor 32 and the distance indicated by the detection signal.

The feeder controlling part 97 substitutes the calculated height S of the article and the supply amount W, which became the target supply amount, into formula (1) and calculates the feed power P. The feeder controlling part 97 controls a continuous motion of the radial feeder 30 with the calculated feed power P. That is, the feeder controlling part 97 controls the motion of the radial feeder 30 during vibration.

The updating part 98 updates formula (1) stored in the storing part 96 during operation. The updating part 98 is different from the deriving part 94 in that it updates formula (1) during operation. The expression "during operation" refers to, for instance, a state in which an article is supplied to the distribution table 20 and is conveyed by the radial feeder 30. The updating part 98 changes the coefficients A and B, and updates the above formula (1).

The height S of the article and the weighed value G of the load cell 56 has a relation shown in formula (5) below.

$$G=aS \quad (5)$$

In formula (5) above, "a" is a slope obtained from the relation between the height S and the weighed value G in a predetermined period. The updating part 98 calculates the slope a in formula (5) on the basis of the height S and the weighed value G obtained during operation. The updating part 98 calculates the slope a in at least two predetermined periods. The slope a and the feed power P have a relation of formula (6) below.

$$a=(1/A)P-B/A \quad (6)$$

The updating part 98 calculates the coefficients A and B from the feed power P and the slope a in a current operation state. The updating part 98 updates the above formula (1) using the calculated coefficients A and B.

(Pool Hoppers)

The combined weighing apparatus 1 has the same number of radial feeders 30 and pool hoppers 40. As illustrated in FIG. 4, the pool hoppers 40 are arranged below peripheries of the radial feeders 30 in a one-to-one correspondence. The pool hoppers 40 temporarily store articles supplied from the radial feeders 30 arranged thereabove.

Each of the pool hoppers 40 has a PH gate 42. The PH gates 42 are provided at lower portions of the pool hoppers 40. The PH gates 42 are opened so that the pool hoppers 40 supply the articles in the pool hoppers 40 to the weighing hoppers 50 disposed below the pool hoppers 40. A link mechanism (not shown) is operated by a stepping motor 44 to open and close each of the PH gates 42. An operation of the stepping motor 44 is controlled by the combined weighing control unit 80 (to be described below).

(Weighing Hoppers)

The combined weighing apparatus 1 has the same number of pool hoppers 40 and weighing hoppers 50. The weighing hoppers 50 are arranged below the pool hoppers 40 in one-to-one correspondence. The weighing hoppers 50 weigh masses of the articles supplied from the pool hoppers 40, that is masses of the articles supplied from the radial feeders 30 via the pool hoppers 40.

Each of the weighing hoppers 50 has a WH gate 52. The WH gates 52 are provided at lower portions of the weighing hoppers 50. The WH gates 52 are opened such that the weighing hoppers 50 supply the articles in the weighing hoppers 50 to the collection discharge chute unit 60. A link mechanism (not shown) is operated by a stepping motor 54 to open and close the WH gates 52. An operation of the stepping motor 54 is controlled by the combined weighing control unit 80 (to be described below).

Each of the weighing hoppers 50 has the load cell (the weighing unit) 56 for weighing the article held in each of the weighing hoppers 50. The load cell 56 is an example of a weighing mechanism. A weighed result of the load cell 56 is sent to a multiplexer 83 of the combined weighing control unit 80 (to be described below) via an amplifier (not shown) as a weighing signal.

(Collection Discharge Chute Unit)

The collection discharge chute unit 60 is an example of a discharge path member. After combined weighing based on the weighed results of the load cells 56, a combination of weighed articles selected from the weighing hoppers 50 are supplied to the collection discharge chute unit 60. The collection discharge chute unit 60 collects the articles supplied from the weighing hoppers 50 and supplies the collected articles to the timing hopper 70.

After the combined weighing based on the weighed results of the load cells 56, the combination of weighed articles selected from the weighing hoppers 50 are supplied to an outer chute 64. The outer chute 64 collects the articles supplied from the weighing hoppers 50 and supplies the collected articles to the timing hopper 70.

(Timing Hopper)

The timing hopper 70 delivers the articles supplied from the collection discharge chute unit 60 to a rear-stage bag making and packaging machine or the like. The timing hopper 70 has a gate 72. The gate 72 is provided at a lower portion of the timing hopper 70. The gate 72 is opened such that the timing hopper 70 supplies the articles in the timing hopper 70 to the rear-stage bag making and packaging machine or the like. A link mechanism 74 is operated by a stepping motor 76 or the like to open and close the gate 72. An operation of the stepping motor 76 is controlled by the combined weighing control unit 80 (to be described below).

(Combined Weighing Control Unit)

As illustrated in FIG. 3, the combined weighing control unit 80 has a central processing unit (CPU) 81 and a memory 82 such as a read only memory (ROM), a random access memory (RAM), or the like. In addition, the combined weighing control unit 80 has a multiplexer 83, an A/D converter 84, and a digital signal processor (DSP) 85.

The multiplexer 83 selects one of weighing signals of the load cells 56 according to an instruction of the DSP 85 and sends the weighing signal to the A/D converter 84. The A/D converter 84 converts the weighing signal (an analog signal) received from the multiplexer 83 into a digital signal according to a timing signal sent from the DSP 85 and sends the digital signal to the DSP 85. The DSP 85 performs filtering on the digital signal sent from the A/D converter 84.

The combined weighing control unit 80 is connected to the components of the combined weighing apparatus 1 such as the stepping motor 44, the stepping motor 54, the stepping motor 76, and the touch panel 86. The touch panel 86 is a liquid crystal display (LCD) that has both input and output functions. The touch panel 86 functions as an input unit and an output unit. The touch panel 86 receives inputs such as various settings related to the combined weighing.

The combined weighing control unit 80 performs a combined weighing calculation based on the weighed values of articles in the weighing hoppers 50. To be specific, first, the combined weighing control unit 80 calculates a mass of an article held in each of the weighing hoppers 50 using the signal filtered by the DSP 85. The combined weighing control unit 80 performs the combined weighing calculation in which the sum of masses of the articles is closest to a target value within a predetermined target mass range. Further, the combined weighing control unit 80 decides on a combination of the weighing hoppers 50 on the basis of the result of the combined weighing calculation. The combined weighing control unit 80 controls the operations of the stepping motors 54 so that the WH gates 52 of the decided weighing hoppers 50 are opened. In addition, the combined weighing control unit 80 determines whether or not any of the weighing hoppers 50 is empty. When any of the weighing hoppers 50 is empty, the combined weighing control unit 80 operates the stepping motors 44 to open the PH gates 42 of the pool hoppers 40 disposed above the weighing hoppers 50. The combined weighing control unit 80 controls opening/closing of the gate 72 of the timing hopper 70.

Next, an operation of the conveyance control unit 90 will be described. For example, when a relational expression deriving mode is enabled by a user, the conveyance control unit 90 initiates operations of the distribution table 20 and the radial feeders 30. At a time of the operation initiation, the conveyance control unit 90 operates the radial feeders 30 with the feed power P, which is previously set as an initial value.

The conveyance control unit 90 controls the drive units 33 to vibrate the troughs 31 with the predetermined feed power P. Due to this action, the conveyance control unit 90 conveys articles supplied from the distribution table 20 outward in the radial direction. At this time, the conveyance control unit 90 measures the heights S and the weighed values G for a given time. The conveyance control unit 90 performs a smoothing process on the heights S from data measured in this way (for instance, calculates a moving average of 10 sections), and obtains the smoothed height Sm. Similarly, the conveyance control unit 90 performs a smoothing process on the weighed values G (for instance, calculates a moving average of 10 sections), and acquires the smoothed weighed value Gm. The deriving part 94 derive the above formula (2), which is an approximate straight line indicating a relation between the smoothed height Sm and the smoothed weighed value Gm.

Next, the conveyance control unit 90 controls the drive units 33 to vibrate the troughs 31 with the feed power P different from the previous feed power. At this time, the conveyance control unit 90 measures the heights S and the weighed values G for a given time, and calculates the smoothed height Sm and the smoothed weighed value Gm. A relation between a slope "a" of the approximate straight line in the above formula (2) and the feed power P is derived. That is, the coefficients A and B are derived. The conveyance control unit 90 stores the relational expression indicated in the above formula (1) derived in this way in the storing part 96.

Next, an operation of the conveyance control unit 90 when a normal mode, that is a combined weighing process, is performed will be described. When a signal for initiating an operation of the combined weighing apparatus 1 is input, the conveyance control unit 90 initiates operations of the distribution table 20 and the radial feeders 30. At a time of the operation initiation, the conveyance control unit 90 operates the radial feeders 30 with the feed power P, which is previously set as an initial value.

When articles located near the discharge ends of the radial feeders 30 are detected by the distance measuring sensors 32, the conveyance control unit 90 receives detection signals sent from the distance measuring sensors 32. The conveyance control unit 90 calculates the heights S of the articles on the basis of the detection signals. The conveyance control unit 90 inputs the calculated heights S of the articles and the supply amount W, which is a target supply amount, into the above formula (1), and calculates the feed power P. The conveyance control unit 90 controls the radial feeders 30 with the calculated feed power P. The conveyance control unit 90 controls the operation of each of the radial feeders 30 according to the same process.

When the articles start to be weighed in the load cells 56 of the weighing hoppers 50, the conveyance control unit 90 updates the coefficients A and B in the above formula (1) on the basis of the weighed values and the heights S. To be specific, the conveyance control unit 90 receives weighing signals sent from the load cells 56 within a predetermined period. The conveyance control unit 90 calculates the slope "a" on the basis of the above formula (5) using weighed values indicated by the received weighing signals and the heights S of the articles. The conveyance control unit 90 obtains the coefficients A and B from the above formula (6) using the slope "a" obtained within at least two predetermined periods. The conveyance control unit 90 updates the above formula (1) with the obtained coefficients A and B.

As described above, in the combined weighing apparatus 1 according to the first embodiment, the drive units 33 can be controlled with the optimal feed power P for achieving the target supply amounts TW on the basis of the feed power P that can be obtained from the relations among the heights S of the articles, a supply amount of the troughs 31, and the feed power P of the troughs 31, which are automatically derived by the deriving part 94. Further, the deriving part 94 can automatically derive the relations among the heights S of the articles, the supply amount W of the troughs 31, and the feed power P of the troughs 31 even in an unknown weighing target of a new product or the like. In the combined weighing apparatus 1, since these relations are used for conveyance control, the target supply amount TW of articles can be supplied from the troughs 31. These radial feeders 30 are used in the combined weighing apparatus 1 to improve weighing accuracy thereof.

In the combined weighing apparatus 1, the feeder controlling part 97 controls the radial feeders 30 with the feed power P obtained from the heights S based on the detected signals detected by the distance measuring sensors 32 and the supply amounts W, which are the target supply amounts in the above formula (1) stored in the storing part 96. The above formula (1), which indicates the relations among the heights S of the articles, the supply amount W of the radial feeders 30, and the feed power P of the radial feeders 30, is stored in the storing part 96. With this constitution, in the combined weighing apparatus 1, the radial feeders 30 can be controlled with the optimal feed power P for achieving the target supply amounts. Therefore, in the combined weighing apparatus 1, the target supply amount of articles can be supplied from the radial feeders 30 to the weighing hoppers 50. As a result, in the combined weighing apparatus 1, the weighing accuracy is improved, and an operating rate is also improved.

Figure 6:
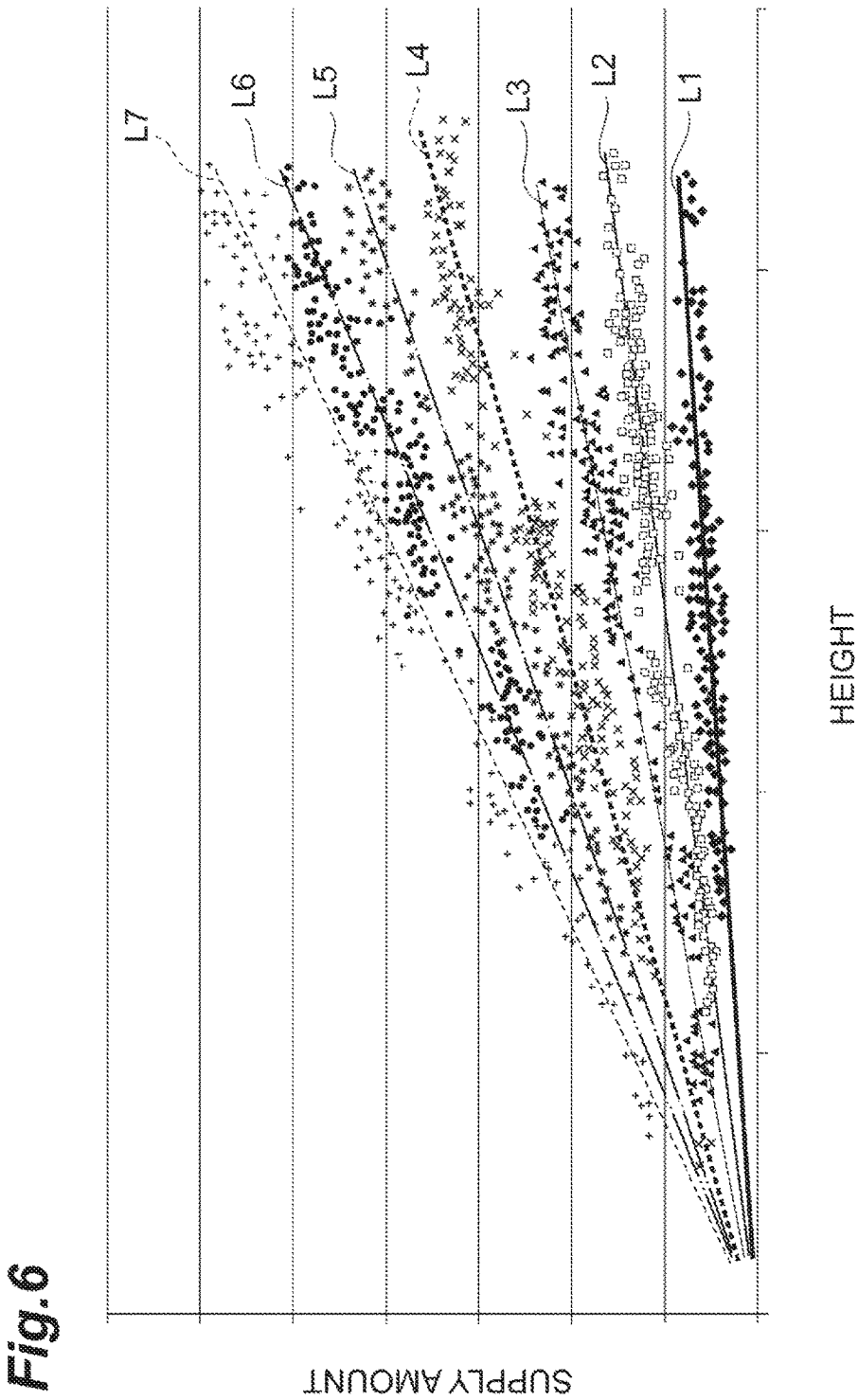
FIG. 6 is a graph illustrating a relation between a height and a supply amount.

FIG. 6 is a graph illustrating a relation between a height and a supply amount. In FIG. 6, the horizontal axis indicates heights of articles on the radial feeders 30, and the vertical axis indicates a supply amount of articles supplied to the weighing hoppers 50. Straight lines L1 to L7 illustrated in FIG. 6 are regression lines (approximately straight lines) of results obtained when the radial feeders 30 are operated for only a predetermined time in a case in which amplitudes of the radial feeders 30 differ.

As illustrated in FIG. 6, in the combined weighing apparatus 1 of the first embodiment, even when amplitudes are changed, a proportional relation between the heights S of articles on the radial feeders 30 and the supply amount W of articles supplied to the weighing hoppers 50 is obtained. That is, in the combined weighing apparatus 1, by detecting the heights S of the articles on the radial feeders 30 and deciding the feed power P depending on the heights S to control the radial feeders 30, the supply amount W, which is the target supply amount, are obtained. Therefore, in the combined weighing apparatus 1, for example in a constitution in which 14 weighing hoppers 50 are provided, since a certain amount of articles can be supplied to each of the weighing hoppers 50 in good balance, seven weighing hoppers 50 can be selected. Thereby, the number of combinations of the weighing hoppers 50 can be maximized. As a result, in the combined weighing apparatus 1, the weighing accuracy and the operating rate are improved.

In the present embodiment, the distance measuring sensors 32 detect distances between the distance measuring sensors 32 and articles on the radial feeders 30. The conveyance control unit 90 detects the heights S of articles located near the discharge ends of the radial feeders 30 on the basis of the distances. Thereby, the conveyance control unit 90 can detect the heights S of the articles just before the articles are supplied to the weighing hoppers 50, that is the articles that will be supplied to the weighing hoppers 50 next. For this reason, the feed power P can be more properly set. As a result, the target supply amount of articles can be stably supplied to the weighing hoppers 50 at.

In the present embodiment, the updating part 98 for updating the above formula (1) stored in the storing part 96 during operation is provided. With this constitution, the above formula (1) can be updated depending on, for instance, a change in a supply state of an article from the distribution table 20, a change in a situation such as a change in a property of the article, or a change in a shape of the radial feeder 30. Thereby, the feed power P of the radial feeders 30 can be controlled on the basis of the above formula (1) which is updated. For this reason, even when a change in a conveyance situation such as a change in the supply state from an upstream side, a change in a property (a large chip, a small chip, etc.) of the article, a flavor deposition, a change in a temperature and humidity, or the like occurs, the target supply amount of articles can be stably supplied to the weighing hoppers 50.

In the present embodiment, when the feed power is defined as P, the height is defined as S, and the supply amount is defined as W, the feed power P is calculated on the basis of the above formula (1). In the combined weighing apparatus 1, the above formula (1) is used to unambiguously obtain the feed power P of the radial feeders 30.

In the present embodiment, the radial feeders 30 convey articles depending on vibration. The feed power P is an amplitude in the radial feeders 30. An amplitude of the vibration is changed in the radial feeders 30 that convey articles depending on the vibration to control the supply amount of the articles. Thereby, control of the supply amount can be performed without depending on an operation capability.

In the present embodiment, the feeder controlling part 97 controls the feed power P of the radial feeders 30 that are continuously operated. In this constitution, since the feed power P of the radial feeders 30 is controlled in a state in which articles are continuously supplied to the weighing hoppers 50, the weighing is continuously performed. For this reason, a drop in weighing efficiency can be suppressed.

In the above embodiment, the example in which the conveyance control unit 90 and the combined weighing control unit 80 are separately provided has been described, but the present invention is not limited thereto. For example, the functions which the conveyance control unit 90 and the combined weighing control unit 80 have may be concentrated in one control unit.

Second Embodiment

Next, a second embodiment will be described. A combined weighing apparatus 1 according to the second embodiment is different from that of the first embodiment in that a control unit 100 is different in constitution from the combined weighing control unit 80 of the first embodiment, and the conveyance control unit 90 is not provided.

Figure 7:
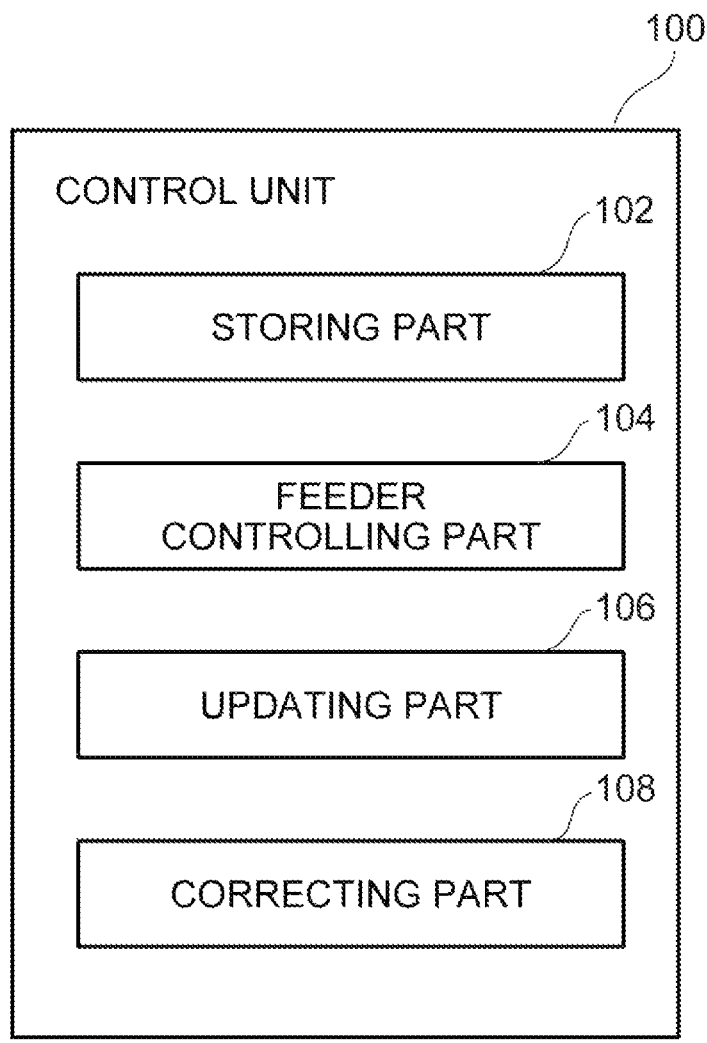
FIG. 7 is a block diagram illustrating a functional constitution of a control unit of a combined weighing apparatus according to a second embodiment.

FIG. 7 is a block diagram illustrating a functional constitution of the combined weighing apparatus according to the second embodiment. As illustrated in FIG. 7, the control unit 100 has a storing part 102, a feeder controlling part 104, an updating part 106, and a correcting part 108.

The storing part 102 stores relations among heights S of articles, a supply amount W of radial feeders 30, and feed power P of the radial feeders 30. To be specific, formula (8) below is stored in the storing part 102.

$$P = A \times W/S + B \tag{8}$$

The feeder controlling part 104 controls the feed power P of the radial feeders 30. The feeder controlling part 104 controls the radial feeders 30 with the feed power P obtained from the heights S of the articles based on the distances detected by the distance measuring sensors 32 and the supply amounts W that art set target supply amounts using the above formula (8). The feeder controlling part 104 calculates the heights S of the articles on the basis of distances indicated by detection signals sent from the distance measuring sensors 32. To be specific, the feeder controlling part 104 calculates the heights S of the articles on the basis of differences between distances from bottoms 30a of the radial feeders 30 to the distance measuring sensors 32 and the distances indicated by the detection signals.

The feeder controlling part 104 substitutes the above formula (8) with the calculated heights S of the articles and the supply amount W, which is the target supply amount, and calculates the feed power P. The feeder controlling part 104 controls operations of the radial feeders 30 continuously operated with the calculated feed power P. That is, the feeder controlling part 104 controls the operations of the radial feeders 30 during vibration.

The updating part 106 updates the above formula (8) stored in the storing part 102 during operation. The expression "during operation" refers to, for instance, a state in which articles are supplied to a distribution table 20 and are conveyed by the radial feeders 30. The updating part 106 changes coefficients A and B, and updates the above formula (8).

The heights S of the articles and weighed values G of load cells 56 have a relation shown in formula (9) below.

$$G = aS \tag{9}$$

In the above formula (9), "a" is a slope obtained from relations between the heights S and the weighed values G in a predetermined period. The updating part 106 calculates the slope a from the above formula (9) on the basis of the heights S and the weighed values G obtained during operation. The updating part 106 calculates the slope a in at least two predetermined periods. The slope a and the feed power P have a relation of formula (10) below.

$$a = (1/A)P - B/A \tag{10}$$

The updating part 106 calculates the coefficients A and B from the feed power P and the slope a in a current operation state. The updating part 106 updates the above formula (8) using the calculated coefficients A and B.

The correcting part 108 corrects the feed power P on the basis of differences between weighed values of articles weighed in the load cells 56 and the target supply amount. The correcting part 108 compares the weighed values of the articles weighed in the load cells 56 and the target supply amount, and corrects the feed power P when a difference exceeding a predetermined range is present between the weighed values and the target supply amount. The predetermined range is set depending on the articles.

To be specific, the correcting part 108 corrects the feed power P calculated by the feeder controlling part 104 depending on the differences between the weighed values and the target supply amount. The correcting part 108 reduces a value of the feed power P when the weighed values exceed the predetermined range and are greater than the target supply amount. The correcting part 108 increases the value of the feed power P when the weighed values exceed the predetermined range and are smaller than the target supply amount. The feeder controlling part 104 controls the operations of the radial feeders 30 with the feed power P corrected by the correcting part 108.

Subsequently, an operation of the control unit 100 will be described. When a signal for initiating operation of the combined weighing apparatus 1 is input, the control unit 100 initiates operations of the distribution table 20 and the radial feeders 30. At a time of the operation initiation, the control unit 100 operates the radial feeders 30 with the feed power P, which is previously set as an initial value.

When articles located near discharge ends of the radial feeders 30 are detected by the distance measuring sensors 32, the control unit 100 receives detection signals sent from the distance measuring sensors 32. The control unit 100 calculates the heights S of the articles on the basis of the detection signals. The control unit 100 calculates the feed power P with the heights S of the articles and the supply amount W, which is a target supply amount, using the above formula (8) stored in the storing part 102. The control, unit 100 controls the radial feeders 30 with the calculated feed power P. The control unit 100 controls the operation of each of the radial feeders 30 according to the same process.

When the articles start to be weighed in the load cells 56 of weighing hoppers 50, the control unit 100 updates the above formula (8) on the basis of the weighed values and the heights S. To be specific, when the control unit 100 receives weighing signals sent from the load cells 56 within a predetermined period, the control unit 100 calculates the slope "a" on the basis of the above formula (9) using weighed values indicated by the received weighing signals and the heights S of the articles. The control unit 100 obtains the coefficients A and B from the above formula (10) using the slope "a" obtained within at least two predetermined periods. The control unit 100 updates the above formula (8) with the obtained coefficients A and B.

When the weighing signals sent from the load cells 56 are received, the control unit 100 obtains differences between the weighed values indicated by the weighing signals and the target supply amount (the supply amount W), and corrects the feed power P of the radial feeders 30 when the differences exceed a predetermined range. The control unit 100 corrects the feed power P calculated by the above formula (8) depending on the differences between the weighed values and the target supply amount.

To be specific, for example, when the weighed values exceed the predetermined range and are greater than the target supply amount, the control unit 100 corrects the feed power P so that the value of the feed power P is smaller than that of the calculated feed power P. Thereby, amplitudes of the radial feeders 30 controlled by the feeder controlling part 104 are reduced, and the supply amount of articles supplied from the radial feeders 30 to the weighing hoppers 50 via pool hoppers 40 is reduced. When the weighed values exceed the predetermined range and are smaller than the target supply amount, the control unit 100 corrects the feed power P so that the value of the feed power P is greater than that of the calculated feed power P. Thereby, the amplitudes of the radial feeders 30 controlled by the feeder controlling part 104 are increased, and the supply amount of the articles supplied from the radial feeders 30 to the pool hoppers 40 is increased.

The control unit 100 performs a combined weighing calculation based on the weighed values of articles in the load cells 56 of the weighing hoppers 50. To be specific, first, the control unit 100 calculates masses of articles held in the weighing hoppers 50 using a signal filtered by a DSP 85 and performs the combined weighing calculation in which the sum of the masses is closest to a target value within a predetermined target mass range. The control unit 100 decides on a combination of the weighing hoppers 50 on the basis of the result of the combined weighing calculation, and controls operations of stepping motors 54 such that WH gates 52 of the decided weighing hoppers 50 are opened. When any of the weighing hoppers 50 is empty, the control unit 100 operates stepping motors 44 to open PH gates 42 of the pool hoppers 40 disposed above the weighing hoppers 50. When articles from the decided weighing hoppers 50 are supplied to a timing hopper 70, the control unit 100 controls a stepping motor 76 so that of a gate 72 of the timing hopper 70 is opened.

As described above, in the combined weighing apparatus 1 according to the second embodiment, the feeder controlling part 104 controls the radial feeders 30 with the feed power P obtained from the heights S based on the detected signals detected by the ranging sensor 32 and the supply amounts W that are the target supply amounts in the above formula (8) stored in the storing part 102. The above formula (8) indicating the relations among the heights S of articles, the supply amount W of radial feeders 30, and the feed power P of the radial feeders 30 is stored in the storing part 102. With this constitution, in the combined weighing apparatus 1, the radial feeders 30 can be controlled with optimal feed power P for achieving the target supply amount.

The combined weighing apparatus 1 includes the correcting part 108 for correcting the feed power on the basis of the differences between the weighed values of the articles weighed in the weighing hoppers 50 and the target supply amounts of the weighing hoppers 50. Thereby, since the weighed values of the articles in the weighing hoppers 50 are actually reflected on the feed power P, highly accurate control is possible. As a result, in the combined weighing apparatus 1, weighing accuracy can be improved.

In the present embodiment, the distance measuring sensors 32 detect distances between the distance measuring sensors 32 and articles on the radial feeders 30. The control unit 100 detects the heights S of articles located near the discharge ends of the radial feeders 30 on the basis of the distances. Thereby, the control unit 100 can detect heights S of the articles just before the articles are supplied to the weighing hoppers 50, that is the articles that will be supplied to the weighing hoppers 50 next. For this reason, the feed power P can be more properly set. As a result, the target supply amount of articles can be stably supplied to the weighing hoppers 50.

In the present embodiment, the updating part 106 for updating the above formula (8) stored in the storing part 102 during operation is provided. With this constitution, for example, the above formula (8) is updated depending on, for instance, a change in a supply state of an article from the distribution table 20, a change in a situation such as a change in a property of the article, or a change in a shape of the radial feeder 30. Thereby, the feed power P of the radial feeders 30 can be controlled on the basis of the above formula (8) which is updated. For this reason, even when a change in a conveyance situation such as a change in the supply state from an upstream side, a change in a property (a large chip, a small chip, etc.) of the article, a flavor deposition, a change in a temperature and humidity, or the like occurs, the target supply amount of articles can be stably supplied to the weighing hoppers 50.

In the present embodiment, when the feed power is defined as P, the height is defined as S, and the supply amount is defined as W, the feed power P is calculated on the basis of the above formula (8). In the combined weighing apparatus 1, the above formula (8) is used to unambiguously calculate the feed power P of the radial feeders 30.

In the present embodiment, the radial feeders 30 convey articles depending on vibration. The feed power P is an amplitude in the radial feeders 30. An amplitude of the vibration is changed in the radial feeders 30 that convey articles depending on the vibration to control the supply amount of the articles. Thereby, the control of the supply amount can be performed without depending on an operation capability.

In the present embodiment, the feeder controlling part 104 controls the feed power P of the radial feeders 30 that are continuously operated. In this constitution, since the feed power P of the radial feeders 30 is controlled in a state in which articles are continuously supplied to the weighing hoppers 50, the weighing is continuously performed. For this reason, a drop in weighing efficiency can be suppressed.

Third Embodiment

Next, a third embodiment will be described. In a combined weighing apparatus 1 according to the third embodiment, relations among heights S of articles, a supply amount W of radial feeders 30, and feed power P of the radial feeders 30 are stored in a storing part 102 of a control unit 100 like in the second embodiment, but they are different from that of the second embodiment.

Figure 8:
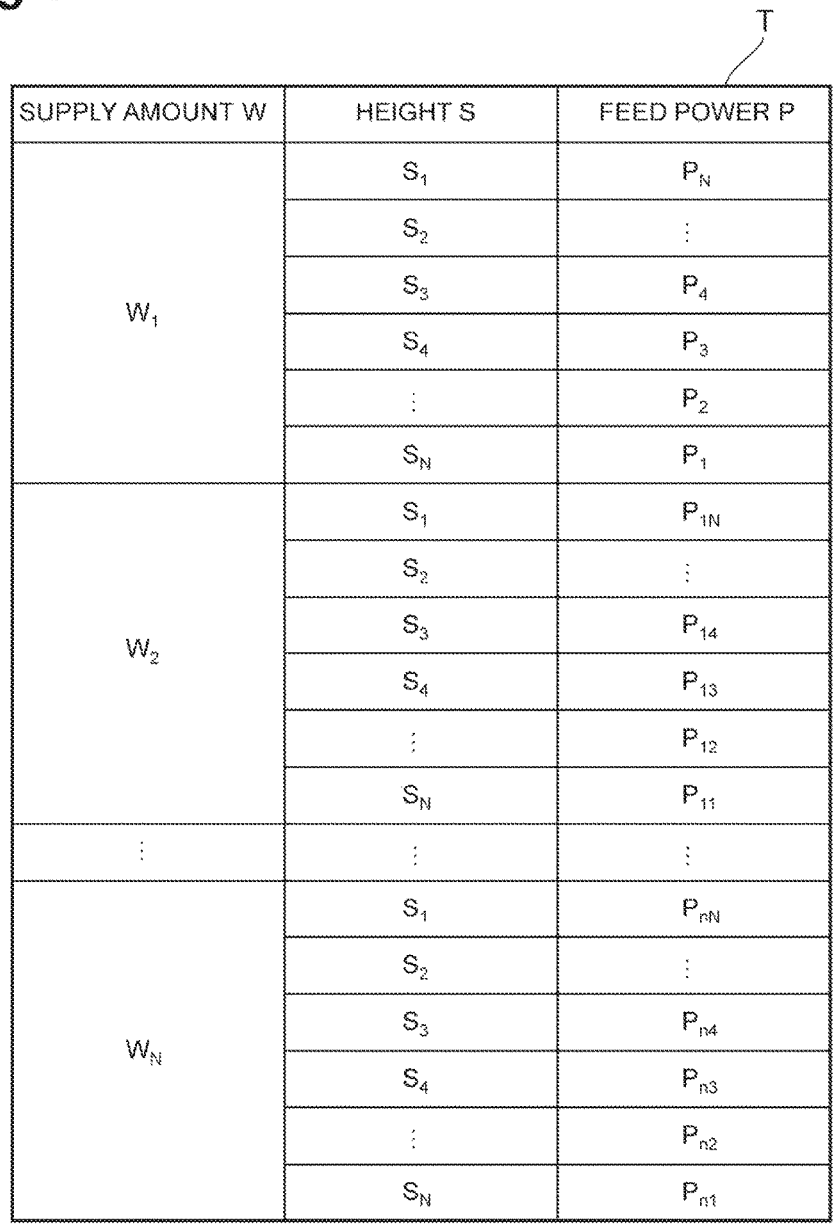
FIG. 8 is a view illustrating an example of a table stored in a storage unit.

The storing part 102 stores the relations among the heights S of the articles, the supply amount W of the radial feeders 30, and the feed power P of the radial feeders 30. To be specific, a table T shown in FIG. 8 is stored in the storing part 102 as information. As illustrated in FIG. 8, a table T has values of the supply amount W (W1, W2, . . . , WN), values of the heights S (S1, S2, . . . , SN) of the articles, and values of the feed power P (PN, PN-1, . . . , P1) corresponding to one another. The values of the supply amount W have a relation of W1<W2< . . . <WN. The heights S have a relation of S1<S2< . . . <SN. The values of the feed power P have a relation of P1<P2< . . . <PN.

In the table T shown in FIG. 8, for example when the supply amount W is defined as "W1," "P4" among the values of the feed power P is selected when the height S of the article is "S3." In other words, if the feed power P is defined as "P4" when the height S of the article is "S3," the supply amount W is "W1."

The feed power P stored in the storing part 102 is calculated by the above formula (8). The table T, in which the feed power P calculated using the coefficients A and B of the initial values is stored, is stored in the storing part 102 as an initial table T. Each piece of information of the table T can be updated (rewritten).

A feeder controlling part 104 controls the feed power P of the radial feeders 30. The feeder controlling part 104 controls the radial feeders 30 with the feed power P obtained from the heights S of the articles based on of the distances detected by distance measuring sensors 32 and the supply amounts W that are set target supply amounts in the table T. The feeder controlling part 104 extracts the feed power P from the heights S of the articles and the supply amount W, which is the set target supply amount, with reference to the table T. To be specific, for example when the supply amount W, which is the set target supply, amount is "W1" and the calculated height S is "S3," the feeder controlling part 104 extracts "P4" as the feed power P. The feeder controlling part 104 controls operations of the radial feeders 30 with the feed power P extracted from the table T.

The updating part 106 updates the table T stored in the storing part 102 during operation. The updating part 106 changes the coefficients A and B in the above formula (1) to calculate the feed power P, and updates the table T. The updating part 106 calculates the coefficients A and B on the basis of the above formula (9) and (10). The updating part 106 calculates the feed power P using the calculated coefficients A and B and the above formula (8), and updates the table T with the feed power P.

The correcting part 108 corrects the feed power P extracted from the table T as described above depending on the difference between the weighed value and the target supply amount. The correcting part 108 reduces a value of the feed power P when the weighed value exceeds a predetermined range and is greater than the target supply amount. The correcting part 108 increases the value of the feed power P when the weighed value exceeds the predetermined range and is smaller than the target supply amount. The feeder controlling part 104 controls the operations of the radial feeders 30 with the feed power P corrected by the correcting part 108.

As described above, in the combined weighing apparatus 1 according to the third embodiment, the feeder controlling part 104 controls the radial feeders 30 with the feed power P obtained from the heights S based on of the detected signals detected by the distance measuring sensors 32 and the supply amounts W becoming the set target supply amounts in the table T stored in the storing part 102. The table T in which the relations among the heights S of the articles, the supply amounts W of the radial feeders 30, and the feed power P of the radial feeders 30 are shown is stored in the storing part 102. With this constitution, in the combined weighing apparatus 1, the radial feeders 30 can be controlled by optimal feed power P for making the target supply amounts.

The correcting part 108 may be a form in which the feed power P extracted from the table T is corrected depending on the difference between the weighed value and the target supply amount, or a form in which the feed power P stored in the table T is corrected (updated).

The present invention is not limited to the above embodiments. For example, in the above embodiments, the distance measuring sensors 32 acting as the detecting units have been described by way of example. However, the detecting units are not limited to the distance measuring sensors 32. The detecting units may be, for instance, cameras, or the like.

It does not matter that the detecting units are interfaces for acquiring information related to the heights detected ranging devices disposed outside. That is, the detecting units have only to have a function of acquiring the information related to the heights of the articles. In this case, the detecting units themselves need not detect or measure the information related to the heights of the articles.

In the above embodiment, the form in which the distance measuring sensors 32 are provided corresponding to the radial feeders 30 one by one has been described by way of example. However, a plurality of distance measuring sensors 32 may be provided in the conveying directions of the radial feeders 30. Thereby, the heights of the articles in multiple places can be detected. For this reason, the radial feeders 30 can be controlled on the basis of an overall state of the articles conveyed by the radial feeders 30.

In the above embodiment, the form in which the distance measuring sensors 32 are provided corresponding to the radial feeders 30 one by one has been described by way of example. However, the distance measuring sensors 32 may not be provided corresponding to the radial feeders 30. For example, the distance measuring sensors 32 may be provided for the radial feeders 30 arranged radially at an interval, for instance, for one between the two radial feeders 30. Sometimes the supply amount of the articles supplied from the distribution table 20 does not vary considerably in the neighboring radial feeders 30. Meanwhile, a result detected by one of the distance measuring sensors 32 is used as a distance from the article in the radial feeders 30 disposed at both sides of the radial feeder 30 detected by the one ranging sensor 32. In this case, since the number of distance measuring sensors (detecting units) can be reduced, a cost can be reduced.

In the above embodiment, the form in which the feed power P of the radial feeders 30 is the amplitude has been described by way of example. However, the feed power P may be a vibration time of the radial feeders 30. Alternatively, the feed power P may be both the amplitude and the vibration time.

In the above embodiment, the form in which the feeder controlling part 104 calculates the heights S of the articles on the basis of the detected signals detected by the distance measuring sensors 32 and obtains the feed power P using the calculated heights S has been described by way of example. However, the form may be a form in which the feeder controlling part 104 obtains the feed power P without calculating the heights S. In the case of this constitution, formula (11) below is used for the calculation of the feed power P.

$$P = A1 \times W/(L-Sp) + B1 \tag{11}$$

In the above formula (11), "A1" and "B1" are coefficients. "L" is a distance from the bottom 30a of the radial feeder 30 to the ranging sensor 32. "Sp" is a detection value (a distance between the ranging sensor 32 the article) indicated by the detecting signal of the ranging sensor 32. When receiving the detecting signal sent from the ranging sensor 32, the feeder controlling part 104 substitutes the detection value Sp indicated by the detecting signal and the supply amount W becoming the target supply amount for the above formula (4), and calculates the feed power P.

In addition to the above embodiment, the supply amounts W, the coefficient A, and the coefficient B may be stored in the storing part 102 by corresponding to shapes of the articles and/or the conveying passages of the radial feeders 30. Thereby, the control corresponding to the shapes of the articles and/or the conveying passages of the radial feeders 30 can be performed. For this reason, the trouble of an operator changing setting of the coefficients or the like in each of the shapes of the articles and/or the conveying passages of the radial feeders 30 can be avoided.

In the above embodiment, the radial feeders 30 acting as the conveying units have been described by way of example. However, the conveying units may be forms in which the articles are conveyed by, for instance, rotatably driven coil units (screws) or belt conveyors. In the case of the coil unit, the feeder controlling part 104 controls revolutions per minute (rpm) or the like of the coil unit as the feed power. In addition, in the case of the belt conveyor, the feeder controlling part 104 controls rpm of a roller driving a belt.

In the above embodiment, the form of the conical arrangement in which the combined weighing apparatus 1 includes the distribution table 20, and the radial feeders 30 are radially arranged around the distribution table 20 has been described by way of example. However, the combined weighing apparatus may be a form of linear arrangement in which the conveying units and the weighing units are linearly arranged side by side.

A method of controlling the radial feeders 30 in the above embodiment can be also applied to, for instance, a cross feeder CF.

REFERENCE SIGNS LIST

1 Combined weighing apparatus
10 Article supply chute
20 Distribution table
30 Radial feeder (conveyor apparatus)
31 Trough (conveying unit)
32 Ranging sensor (detecting unit)
33 Drive unit
40 Pool hopper
50 Weighing hopper
56 Load cell
80 Combined weighing control unit
86 Touch panel
90 Conveyance control unit
93 Supply amount acquiring part
94 Deriving part
96, 102 Storing part
97, 104 Feeder controlling part
98, 106 Updating part
100 Control unit
108 Correcting part

The invention claimed is:

1. A conveyor apparatus that controls an operation of a conveying unit such that articles supplied from the conveying unit becomes a target supply amount, the conveyor apparatus comprising:
   a detecting unit configured to detect a height (S) of the articles on the conveying unit;
   a drive unit configured to drive the conveying unit with predetermined feed power;
   a supply amount acquiring part configured to acquire a supply amount (W) supplied from the conveying unit; and
   a deriving part configured to change the feed power from the drive unit multiple times to convey the articles to the conveying unit, acquire the height (S) of the articles and the supply amount (W) when the different types of feed power are set, and calculate a relation among the height of the articles, the supply amount of the conveying unit, and the feed power of the conveying unit using the acquired height (S) of the articles and the acquired supply amount (W).

2. The conveyor apparatus according to claim 1, further comprising a control unit configured to drive the drive unit with the feed power obtained from the height detected in the detecting unit and the target supply amount in the relation.

3. The conveyor apparatus according to claim 1, wherein the deriving part calculates a coefficient (A) and a coefficient (B) in a formula below on the basis of the height (S) and the supply amount (W) that are acquired for each of the different types of feed power (P) when the deriving part changes the feed power from the drive unit multiple times to convey the articles to the conveying unit.

$$P = A \times W/S + B$$

4. The conveyor apparatus according to claim 3, further comprising an updating part configured to update the coefficient (A) and the coefficient (B) on the basis of the height (S) and the supply amount (W) that are acquired when the articles are conveyed in a state in which the feed power is controlled to become the target supply amount.

5. The conveyor apparatus according to claim 3, wherein the deriving part calculates the coefficient (A) and the coefficient (B) by smoothing the height (S) and the supply amount (W) with respective moving averages.

6. A combined weighing apparatus having:
    a distribution unit configured to distribute articles;
    a plurality of conveying units configured to convey the articles supplied from the distribution unit; and
    a plurality of weighing units arranged corresponding to the plurality of conveying units and configured to weigh the articles supplied from the conveying units,
    the combined weighing apparatus controls an operation of each of the conveying units such that the articles supplied to the weighing units become a target supply amount, and comprises:
    detecting units configured to detect heights of the articles on the conveying units;
    a storing part configured to store data corresponding to relations among the heights of the articles, supply amounts of the conveying units, and feed power of the conveying units; and
    a control unit configured to control the conveying units with the feed power obtained from the heights detected by the detecting units and the target supply amounts in the relations.

7. The combined weighing apparatus according to claim 6, comprising a correcting part configured to correct the feed power on the basis of differences between weighed values of the articles weighed in the weighing units and the target supply amounts.

8. The combined weighing apparatus according to claim 6, wherein the detecting units detect the heights of the articles located adjacent to discharge ends of the conveying units.

9. The combined weighing apparatus according to claim 6, comprising an updating part configured to update the relations stored in the storing part during operation.

10. The combined weighing apparatus according to claim 6, wherein, when the feed power is defined as P, the height is defined as S, and the supply amount is defined as W, the feed power (P) is calculated on the basis of a formula below:

$$P = A \times W/S + B$$

where A and B are coefficients.

11. The combined weighing apparatus according to claim 10, wherein the supply amounts (W), the coefficient (A), and the coefficient (B) are stored in the storing part by corresponding to shapes of the articles and/or conveying passages of the conveying units.

12. The combined weighing apparatus according to claim 6, wherein:
    the conveying units convey the articles depending on vibration; and
    the feed power is an amplitude in the conveying units.

13. The combined weighing apparatus according to claim 6, wherein the plurality of detecting units are provided in conveying directions of the conveying units.

* * * * *